(12) United States Patent
Kliger et al.

(10) Patent No.: US 10,911,479 B2
(45) Date of Patent: Feb. 2, 2021

(54) REAL-TIME MITIGATIONS FOR UNFAMILIAR THREAT SCENARIOS

(71) Applicant: MICROSOFT TECHNOLOGY LICENSING, LLC, Redmond, WA (US)

(72) Inventors: Ben Kliger, Ramat-Gan (IL); Moshe Israel, Ramat-Gan (IL); Dotan Patrich, Rishon LeZion (IL); Michael Zeev Bargury, Ramat-Gan (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 156 days.

(21) Appl. No.: 16/056,052

(22) Filed: Aug. 6, 2018

(65) Prior Publication Data

US 2020/0045075 A1 Feb. 6, 2020

(51) Int. Cl.
*H04L 29/06* (2006.01)
*G06F 21/52* (2013.01)
*G06F 21/55* (2013.01)
*G06K 9/62* (2006.01)

(52) U.S. Cl.
CPC .......... *H04L 63/1441* (2013.01); *G06F 21/52* (2013.01); *G06F 21/552* (2013.01); *G06F 21/554* (2013.01); *G06K 9/6267* (2013.01); *H04L 63/1416* (2013.01); *H04L 63/1425* (2013.01); *H04L 63/1433* (2013.01)

(58) Field of Classification Search
CPC ............. H04L 63/1441; H04L 63/1433; H04L 63/1425; H04L 63/1416; H04L 63/14; G06K 9/6267; G06F 21/554; G06F 21/552; G06F 21/52; G06F 21/55; G04W 12/12

See application file for complete search history.

(56) References Cited

U.S. PATENT DOCUMENTS

| | | |
|---|---|---|
| 8,904,538 B1 | 12/2014 | Glick et al. |
| 9,692,789 B2 | 6/2017 | Kirti et al. |
| 9,769,046 B2 | 9/2017 | Sabin |
| 10,489,586 B2 | 11/2019 | Monastyrsky et al. |

(Continued)

OTHER PUBLICATIONS

"International Search Report and Written Opinion Issued in PCT Application No. PCT/US19/039639", dated Sep. 20, 2019, 14 Pages.

(Continued)

*Primary Examiner* — Khoi V Le
(74) *Attorney, Agent, or Firm* — Workman Nydegger

(57) ABSTRACT

A computing system performs real-time mitigations for unfamiliar threat scenarios by identifying a particular threat scenario for a client system that has not previously experienced the threat scenario and for which a remediation process is unknown. The computing system responds to the unknown threat scenario by generating and providing the client system a mitigation file that includes a predictive set of mitigation processes for responding to the threat scenario. The mitigation file is generated by first generating a threat vector that identifies a plurality of different threat scenario characteristics for the particular threat scenario. Then, a classification model is applied to the threat vector to identify a predictive set of mitigation processes that are determined to be a best fit for the threat vector and that are included in the mitigation file.

18 Claims, 8 Drawing Sheets

(56) References Cited

U.S. PATENT DOCUMENTS

| | | |
|---|---|---|
| 2009/0099896 A1 | 4/2009 | O'sullivan et al. |
| 2009/0183023 A1* | 7/2009 | Rathunde .............. H04L 41/064 |
| | | 714/4.2 |
| 2010/0077481 A1* | 3/2010 | Polyakov .............. G06F 21/568 |
| | | 726/24 |
| 2010/0082513 A1 | 4/2010 | Liu |
| 2010/0154059 A1 | 6/2010 | Mcnamee et al. |
| 2014/0052849 A1* | 2/2014 | Sabin .................... H04L 41/147 |
| | | 709/224 |
| 2014/0082730 A1* | 3/2014 | Vashist .................. H04L 67/22 |
| | | 726/23 |
| 2016/0180087 A1* | 6/2016 | Edwards ............... G06F 21/566 |
| | | 726/24 |
| 2016/0261615 A1 | 9/2016 | Sonnenberg et al. |
| 2018/0167403 A1* | 6/2018 | Smith .................. H04L 63/1408 |
| 2018/0219911 A1 | 8/2018 | Manadhata et al. |
| 2018/0316695 A1* | 11/2018 | Esman ............... G06Q 20/4016 |
| 2018/0365419 A1* | 12/2018 | Monastyrsky .......... G06F 21/54 |
| 2019/0052675 A1* | 2/2019 | Krebs ................. H04L 63/1416 |
| 2019/0245879 A1* | 8/2019 | Ward ..................... H04L 63/20 |
| 2019/0306181 A1 | 10/2019 | Mahadevia et al. |
| 2020/0044911 A1* | 2/2020 | Kliger .................. H04L 41/064 |

OTHER PUBLICATIONS

Saeed, et al., "Fusing Information from Tickets and Alerts to Improve the Incident Resolution Process", In Information Fusion, vol. 45, Jan. 2019, pp. 38-52.

"Ex-Parte Quayle Action Issued in U.S. Appl. No. 16/056,157", Mailed Date: Dec. 16, 2019, 6 Pages.

"International Search Report and Written Opinion Issued in PCT Application No. PCT/US2019/039645", dated Sep. 25, 2019, 11 Pages.

* cited by examiner

Client 1
Alert Type 1

| 300 Process | Distance Attribute 1 | Distance Attribute 2 | Distance Attribute 3 | Distance Attribute 4 |
|---|---|---|---|---|
| A | Value $A_1$ | Value $A_2$ | Value $A_3$ | Value $A_4$ |
| B | Value $B_1$ | Value $B_2$ | Value $B_3$ | Value $B_4$ |
| C | Value $C_1$ | Value $C_2$ | Value $C_3$ | Value $C_4$ |
| D | Value $D_1$ | Value $D_2$ | Value $D_3$ | Value $D_4$ |
| E | Value $E_1$ | Value $E_2$ | Value $E_3$ | Value $E_4$ |
| F | Value $F_1$ | Value $F_2$ | Value $F_3$ | Value $F_4$ |
| G | Value $G_1$ | Value $G_2$ | Value $G_3$ | Value $G_4$ |

*Figure 3*

Client 1
Alert Type 1

400
| |
|---|
| Process A |
| Process C |
| Process D |
| Process F |
| Process G |

*Figure 4*

Alert Type 1

| | Process A | Process B | Process C | Process D | Process E | Process F | Process G | Process H | ... | Process I | ... | Process n |
|---|---|---|---|---|---|---|---|---|---|---|---|---|
| Client 1 | X | | X | X | | X | X | | | | | |
| Client 2 | X | | X | X | | X | X | | | | | |
| Client 3 | X | | | X | | | X | X | | | | X |
| Client 4 | X | | | X | | | X | X | | | | X |
| Client 5 | X | X | | X | | | X | X | | | | X |
| Client 6 | X | X | | X | | | X | X | | | | |
| ... | | | | | | | | | | | | |
| Client n | X | | X | X | X | | X | | | X | | X |

Composite Remediation Files

Client Type (All)
610
- Process A
- Process D
- Process G

Client Type (Majority)
620
- Process A
- Process D
- Process G
- Process H

Client Type 1-2
630
- Process A
- Process C
- Process D
- Process F
- Process G

Client Type 3-4
640
- Process A
- Process D
- Process G
- Process H

Client Type 5-6
650
- Process A
- Process B
- Process D
- Process G
- Process H
- Process n Clients (All Processes > 1)
660
- Process A
- Process B
- Process C
- Process D
- Process F
- Process G
- Process H
- Process n Threat / Alert Classification Type(s)
670
- Process B
- Process Q
- Process P
- • • • 672

| Threat/Alert Type | Distance Attribute 1 | Distance Attribute 2 | Distance Attribute 3 | Distance Attribute 4 | ... | Distance Attribute n |
|---|---|---|---|---|---|---|
| A | Value A$_1$ | Value A$_2$ | Value A$_3$ | Value A$_4$ | | Value A$_n$ |
| B | Value B$_1$ | Value B$_2$ | Value B$_3$ | Value B$_4$ | | Value B$_n$ |
| C | Value C$_1$ | Value C$_2$ | Value C$_3$ | Value C$_4$ | | Value C$_n$ |
| D | Value D$_1$ | Value D$_2$ | Value D$_3$ | Value D$_4$ | | Value D$_n$ |
| E | Value E$_1$ | Value E$_2$ | Value E$_3$ | Value E$_4$ | | Value E$_n$ |
| F | Value F$_1$ | Value F$_2$ | Value F$_3$ | Value F$_4$ | | Value F$_n$ |
| G | Value G$_1$ | Value G$_2$ | Value G$_3$ | Value G$_4$ | | Value G$_n$ |
| n | Value n$_1$ | value n$_2$ | value n$_3$ | value n$_4$ | | value n$_n$ |

Threat Vector

*Figure 8*

REAL-TIME MITIGATIONS FOR UNFAMILIAR THREAT SCENARIOS

BACKGROUND

Computers and computing systems have affected nearly every aspect of modern living. Computers are generally involved in work, recreation, healthcare, transportation, entertainment, household management, etc.

Some computer functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web-based services for communicating back and forth with clients.

Unfortunately, the cloud and interconnection of computing systems exposes the computing systems to vulnerabilities and threats from malicious parties. For instance, a malicious party can transmit malware code to an unsuspecting computing system or create applications that are knowingly executed by the computer system, but which contain hidden malware that performs undesired actions on the computing system. It is also possible for a malicious party to initiate a brute force attack or DDoS (distributed denial-of-service) attack on a computing system.

In order to address and prevent threat scenarios, such as those described above, many organizations employ information technology (IT) specialists to monitor the health of their computer systems, identify alerts associated with threat scenarios, and to manage and update antivirus and antimalware software to mitigate against the newly developed and discovered threats. This type of monitoring and updating, however, is very expensive and time consuming. Furthermore, many organizations are not equipped with the same monitoring software and/or are unable to hire a fulltime specialist that is aware of all possible remedial actions available for the newly developed and discovered threats. Different remedial solutions are also not always appropriate for all organizations, which further complicates matters. Accordingly, the IT specialist is often left to their own devices to search the Internet for possible solutions that may be appropriate to address a threat scenario. This, however, is a very inefficient process. In many instances, it is also entirely impractical or impossible for an IT specialist to even identify the best remediation processes to perform for their computing system(s), due to the variety of computing systems that exist and the various types of possible solutions that are available to be implemented to address different threat scenarios.

The foregoing problems are even more pronounced when a new and unknown threat scenario occurs, one for which no remediation protocol has been established by anyone. In particular, the IT professional can search and search for the remediation protocol, but will not find any. In such situations, it would be helpful to provide a way for the IT professional and threatened system to know how to respond to the unknown threat scenario.

Accordingly, there is an ongoing need and desire to identify and provide new techniques for identifying and applying remedial processes for addressing threat scenarios, and particularly new and unknown threat scenarios.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed to systems, methods and storage devices that are configured to facilitate real-time mitigations for unknown threat scenarios.

In some embodiments, a computing system performs real-time mitigations for unfamiliar threat scenarios by identifying a particular threat scenario for a client system that has not previously experienced the threat scenario and for which a remediation process is unknown. The computing system responds to the unknown threat scenario by generating and providing the client system a mitigation file that includes a predictive set of mitigation processes for responding to the threat scenario.

The mitigation file is generated by first generating a threat vector that identifies a plurality of different threat scenario characteristics for the particular threat scenario. Then, a classification model is applied to the threat vector to identify a predictive set of mitigation processes that are determined to be a best fit for the threat vector and that are dynamically added to the mitigation file.

In some instances, the classification model includes a plurality of different client remediation process sets that correspond to different types of alerts associated with different threat scenarios, at least some of the different threat scenarios correlating with the particular unknown threat scenario, and such that the mitigation file comprises remediation processes that are identified as corresponding to alert types determined to correlate with the particular threat scenario.

In some instances, the plurality of different client remediation process sets for each type of alert of the different types of alerts by performing, for each identified alert, the following: identifying a plurality of processes performed by a corresponding plurality of different client systems that are performed within a predetermined time and/or process proximity to the identified alert; determining which of the plurality of processes are related to the identified alert based on a correlation vector of the plurality of processes and the identified alert; and for each client of the plurality of different client systems, creating a client remediation process set that includes the processes that are determined to be related to the identified alert and that were performed by the client within the predetermined period of time and/or process proximity to the identified alert.

In some embodiments, the mitigation file comprises a non-executable list of remedial actions for addressing the threat scenario.

In alternative or additional embodiments, the mitigation file comprises an executable file having executable instructions corresponding to the remediation process sets for automatically performing remedial actions in response to running the mitigation file at the client system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates a representation of a correlation vector for a plurality of processes and their correlations to an alert;

FIG. 4 illustrates a representation of a remediation process set derived from the correlation vector shown in FIG. 3;

FIG. 5 illustrates a representation of a cluster of remediation process sets for different clients associated with a particular alert;

FIG. 6 illustrates various representations of composite remediation files, such as could be derived from the cluster of remediation process sets;

FIG. 8 illustrates a representation of a threat vector that can be used to identify different types of threats/alerts.

DETAILED DESCRIPTION

The disclosed embodiments are generally directed to systems, methods and storage devices that are configured to facilitate auto-mitigation and remediation of threat scenarios based on crowd sourcing security solutions.

In some embodiments, a computing system performs real-time mitigations for unfamiliar threat scenarios by identifying a particular threat scenario for a client system that has not previously experienced the threat scenario and for which a remediation process is unknown. The computing system responds to the unknown threat scenario by generating and providing the client system a mitigation file that includes a predictive set of mitigation processes for responding to the threat scenario. The mitigation file is generated by first generating a threat vector that identifies a plurality of different threat scenario characteristics for the particular threat scenario. Then, a classification model is applied to the threat vector to identify a predictive set of mitigation processes that are determined to be a best fit for the threat vector and that are included in the mitigation file.

As used herein, the terms "mitigation" and "remediation" are used interchangeably and refer to a response protocol for responding to a particular threat or alert condition. In this regard, it will be appreciated that the threat or alert conditions are also referred to interchangeably, along with other terms like "threat scenario," "threat," "alert."

It will be appreciated from the disclosure provided herein, the disclosed embodiments are able to address technical and practical problems associated with mitigation of threat scenarios, including unknown threat scenarios having no established remediation protocol, by improving the manner in which a computing system is able to apply machine learning and artificial intelligence to automatically and dynamically generate mitigation files with remediation processes that are predicted/estimated to mitigate the unknown threat scenario, and in a way that is not possible or at least practical by a human.

Automatic Generation of Threat Remediation by Crowd Sourcing Security Solutions

Figure 1:
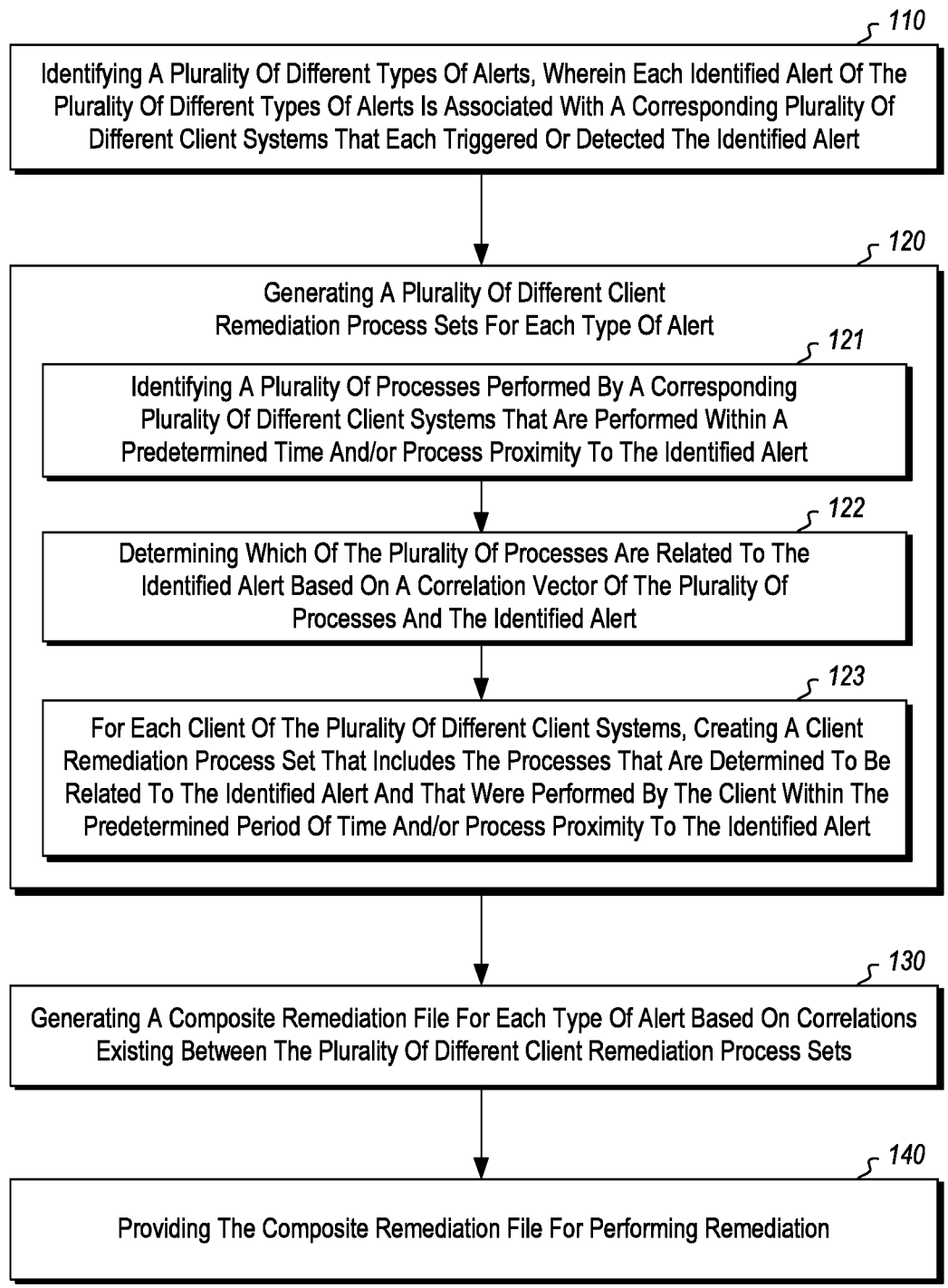
FIG. 1 illustrates a flow diagram of acts associated with disclosed methods for performing automatic generation of threat remediation by crowd sourcing security solutions.

FIG. 1 illustrates various acts of a flowchart 100 that are performed by a computing system (e.g., the computing system 200 shown in FIG. 2) for performing automatic generation of remediation steps by crowd sourcing security solutions.

As illustrated, the computing system identifies a plurality of different types of alerts, wherein each identified alert of the plurality of different types of alerts is associated with a corresponding plurality of different client systems that each triggered or detected the identified alert (act 110). This identification of alerts can be based on various information. For instance, the computing system can identify an alert by receiving/identifying a definition of an alert from an application or remote system (e.g., clients 270, 272, 274). The computing system can also automatically define an alert based on detecting an anomaly associated with a configuration file a log file or a measured computer health metric associated with a computer component, such as when performing automatic health monitoring of the various client systems.

In some instances, the identified alert is for a detected threat scenario, such as a virus, malware, DDoS, brute force attack, unexpected change in performance, capacity or bandwidth, an unexpected or unauthorized request, an unexpected execution or process being performed, and so forth. In some instances, the identified alert is for a process that is uncertain as to whether it is associated with a malicious activity, but which could be, such as an installation, update, modification, deletion, upload, download or other processing of a file.

FIG. 3 illustrates one example of a correlation vector 300 that is generated and used, in some instances, to identify processes associated with an alert and which can also be used to identify an alert from processes that are being performed. The correlation vector 300 will be described in more detail below.

Upon identifying the alert(s), the computing system generates a plurality of different client remediation process sets for each of the alerts or types of alerts (act 120). This process includes various sub-steps or sub-acts, including: (1) for each identified alert or alert type, identifying processes performed by a corresponding plurality of different client systems within a predetermined time and/or process proximity to and after the identified alert (act 121), determining which of the plurality of processes are related to the identified alert based on a correlation vector of the plurality of processes and the identified alert (act 122), and for each client of the plurality of different client systems, creating a client remediation process set that includes the processes that are determined to be related to the identified alert and that were performed by the client within the predetermined period of time and/or process proximity to the identified alert (act 123).

The identification of processes being performed by a computing system (act 121) can include logging processes and/or accessing log files. In some instances, this can also include filtering the identified processes so as to identify a subset of all processes being performed and exclude processes that are too distant in time or correlated proximity to the alert condition. For instance, if an alert condition is detected as occurring at a particular time, the identified processes may be limited/filtered to only include the subset of processes that occurred a predetermined time after the alert condition. This predetermined time may be a threshold period defined by minutes, hours, days or another duration from the occurrence of the alert condition.

Likewise, the identified processes may be limited/filtered to only include a subset of processes performed by particular components of a computing system that are determined to be proximate to or that otherwise closely correlate with the alert condition (e.g., processors in a same host system, sessions running or opened by a particular application associated with the alert condition, virtual machines associated with a particular client, particular load balancers, routers, servers, services or web sites, etc.).

The act of determining which of the plurality of processes are related to the identified alert based on a correlation vector of the plurality of processes and the identified alert (act 122), can involve the building/processing of a correlation vector, such as represented by the correlation vector 300 shown in FIG. 3.

While the current embodiment only includes seven processes (i.e., processes A-G), it will be appreciated that in other embodiments, the correlation vector will include many more processes and can include any quantity of the full set of identified processes or only a limited/filtered subset of processes (e.g., tens, hundreds, thousands and even more processes), based on time, component, or any other qualifier.

In some instances, the initial set of processes is used to help find and identify an alert condition (act 110). In other instances, the set of processes is selectively filtered, based on an already defined alert condition and based on selecting only the processes that are determined to have occurred within a threshold period of time and/or process proximity to the defined alert condition (as generally described above).

In the current embodiment, the correlation vector 300 associates each of the identified processes (A-G) with corresponding distance attributes (i.e., distance attributes 1-4). While only four distance attributes are shown, any number of distance attributes may be utilized, to accommodate different needs and preferences.

In some instances, the distance attributes are represented as values (e.g., Values $A_1$-$G_4$) that comprise absolute or, alternatively, normalized/relative values that can be used to identify a correlation distance between the process and a particular alert or alert type. In other embodiments, the distance attributes are values are actually strings or other types of identifiers (other than numerical values) that are used to filter the processes during the construction of remediation process sets.

In some instances, the distance attributes include such things as a time proximity to the alert condition or alert triggering event, a component performing the process, a networked proximity to the component(s) identified as being involved in the alert condition, uniqueness, frequency of execution, execution counters, known correlation between the process and the alert condition and/or any other metric that can be used to evaluate relative correlation between a process and a known alert condition.

The distance attributes can then be normalized, in some instances, to identify relative weight or distance of the corresponding process to a particular alert and to thereby determine which of the processes are likely associated with the alert condition. Alternatively, or additionally, the processes can be filtered by a particular identifier or threshold value (e.g., Values $A_1$-$G_4$).

In some instances, the process of determining which processes are related to the identified alert (act 122) is performed to identify the specific processes a client performs in remediation of a detected alert condition. These processes can be automatic processes based on antivirus/antimalware software and/or processes that are manually triggered or implemented based on an administrator/user action or input command. For instance, the processes can include such things as turning on a firewall, turning off a port, changing passwords, turning off a service, reinstalling or reformatting a file, quarantining a file, disabling a particular component or application, blocking traffic from a particular address, generating a notification for an administrator or a third party, rebalancing network traffic, instantiating a new session or functionality, spinning up or recruiting a new resource into a distributed network, creating a copy or backup of data, turning off or rebooting a system/component and/or any other process.

The sub-act of creating the remediation process set (act 123) and/or the act of generating the plurality of remediation process sets (act 120) can also include storing a data structure that represents the remediation process set. An illustrative example of a remediation process set for the correlation vector 300 of FIG. 3 is remediation process set 400. As shown, this remediation process set 400 comprises process performed by client 1 for alert type 1. In this regard, it will be appreciated that alert type 1 can be any type of alert condition (e.g., detected DDoS, detected login request with unauthorized credentials, detected execution of an unknown and unexpected executable, or any other alert condition). In some instances, multiple different remediation process sets associated with different alert conditions are created and stored for each client of a plurality of different clients.

The next illustrated act of the flowchart 100 shown in FIG. 1 is the act of the computing system generating a composite remediation file for each type of alert based on correlations existing between the plurality of different client remediation process sets (act 130). This can be accomplished, for example, by saving a single file or a distributed file that identifies a listing of one or more common remediation processes from a plurality of the different client remediation process sets for a common alert condition and that satisfy a threshold of commonality or correlation between the plurality of different client remediation process sets and while omitting one or more uncommon remedial processes from the composite remediation file that fail to satisfy the threshold of commonality or correlation between the different client remediation process sets.

In some instances, the process of generating the composite remediation file (act 130) includes identifying/generating a cluster of remediation process sets associated with different clients and a common alert condition. A representation of a cluster of remediation process sets 500 is shown in FIG. 5. As illustrated, numerous client remediation process sets (corresponding to clients 1-6 and n) are compiled into a single table that reflects processes that were determined to satisfy the respective thresholds for being selected and included in corresponding remediation process sets for the different clients. For instance, the remediation process set 400 of FIG. 4 is illustrated in the top row of the cluster of remediation process sets 500, with process A, C, D, F and G being marked as processes being performed by client 1 in response to alert type 1. The cluster of remediation process sets 500 also includes a remediation process set for client 2, associated with the same alert type 1, in which client 2 is determined to have performed processes A, C, D, F and G, which is the same set of processes performed by client 1. However, clients 3, 4, 5, 6 and n have performed a different set of processes in response to the same alert, as reflected by their corresponding remediation process set indicators in the cluster.

While only a few client remediation process sets are shown in the cluster, it will be appreciated that any number of client remediation process sets can be included. In fact, the more process sets that are used, the more accurate the final composite remediation file output is likely to be.

In some instances, the generation of the composite remediation files (130) is based on assembling a cluster of remediation process sets for a particular alert type that omits some of the total identified or stored remediation process sets that are associated with the alert type, such as by omitting remediation process sets that correspond to clients that are not of a particular type. Even more specifically, the cluster of remediation process sets may filter or only include a subset of available remediation process sets so as to include only the remediation process sets of computing systems that are determined to be of a particular type (e.g., systems having common processing configurations, common operating systems, common network configurations, etc.). This can enable, in some instances, for a target system that is experiencing an alert condition to obtain a corresponding composite remediation file that is specifically tailored for and based on the remediation process sets of similarly configured client systems.

Once the cluster of remediation process sets 500 is assembled/identified, the computing system can perform analysis of the various processes to determine which processes should be included in one or more composite remediation file(s) (act 130), such as composite remediation files 610, 620, 630, 640, 650 and 660 of FIG. 6. This determination is primarily based on a determination that the processes satisfy a particular threshold of correlation.

For instance, in some instances, the selection of processes for the composite remediation file, such as composite remediation file 610, are based on determination that the processes to be included are performed by all clients having client remediation process sets in the cluster. In this instance, the threshold of correlation is the inclusion in the cluster as being associated with a particular type of alert.

In other instances, the selection of processes for the composite remediation file, such as composite remediation file 620, are based on determination that the processes to be included are performed by a majority of clients having client remediation process sets in the cluster. In this instance, the threshold of correlation is the processes are associated with a majority of clients remediating a particular alert condition.

In other instances, the selection of processes for the composite remediation file, such as composite remediation files 630, 640 and 650, are based on determination that the processes to be included are performed by all or a majority of clients of the same type or similar types (e.g., a system type correlation). For instance, if the labeling of the clients 1-5 and n, shown in FIG. 5, was a client type identifier, rather than just a sequential quantity identifier, then the processes performed by clients of types 1-2 (e.g., client 1 and client 2) would be included in the composite remediation file 630, which is based on client types 1-2. Likewise, processes performed by clients of types 3-4 would be included in the composite remediation file 640 and processes performed by clients of types 5-6 are included in the composite remediation file 650). Although not illustrated, an additional composite remediation file for client type n would include processes A, C, D, E, G, I and n. Likewise, a composite remediation file for a quantity of different types (of more than 2 types) could be included into a single composite remediation file, although not presently illustrated.

It will also be appreciated that in some instances, the composite remediation files contain a listing of processes that are non-executables and that do not include any triggers for triggering the execution of the listed processes. In some embodiments, however, the composite remediation files, alternatively or additionally, contain actual executables for either executing the processes by a target system and/or include triggers for triggering executables that are available to the target system, such as when the target system loads or runs the composite remediation files. In these instances, the generation of the composite remediation files further includes acts of, for each relevant/corresponding process in the composite file, downloading and loading the executables and/or triggers into the composite remediation files.

While the presently illustrated composite remediation files (610, 620, 630, 640, 650 and 660) contain only a few processes (i.e., 3≤processes≥8), it will be appreciated that the composite remediation file may include any quantity of relevant processes that are determined to be sufficiently correlated with a particular alert type and, in some embodiments, further based on client type. For instance, the composite remediation file may contain only 1 or 2 processes or, in some instances, nine or more processes.

In some embodiments, the generation of the composite remediation file(s) further includes receiving user input for including or excluding a particular remedial action from the composite remedial action file (or remediation process set or correlation vector) based on a prompt that is triggered in response to determining there is not enough information for determining whether the particular remedial action satisfies or fails to satisfy the threshold of correlation between the plurality of different client remediation process sets, or a threshold of commonality or correlation proximity to a particular alert condition or system type.

As shown in FIG. 6, the various composite remediation files do not necessarily have to be classified or separated based on client type. Alternatively, they can be based on threat/alert classification type(s), such as reflected by file 670, which may include any quantity of relevant processes (as reflected by ellipses 627). The composite remediation files may also be based on any type of classification of client type, alert type or other factors, as represented by ellipses 680.

Figure 2:
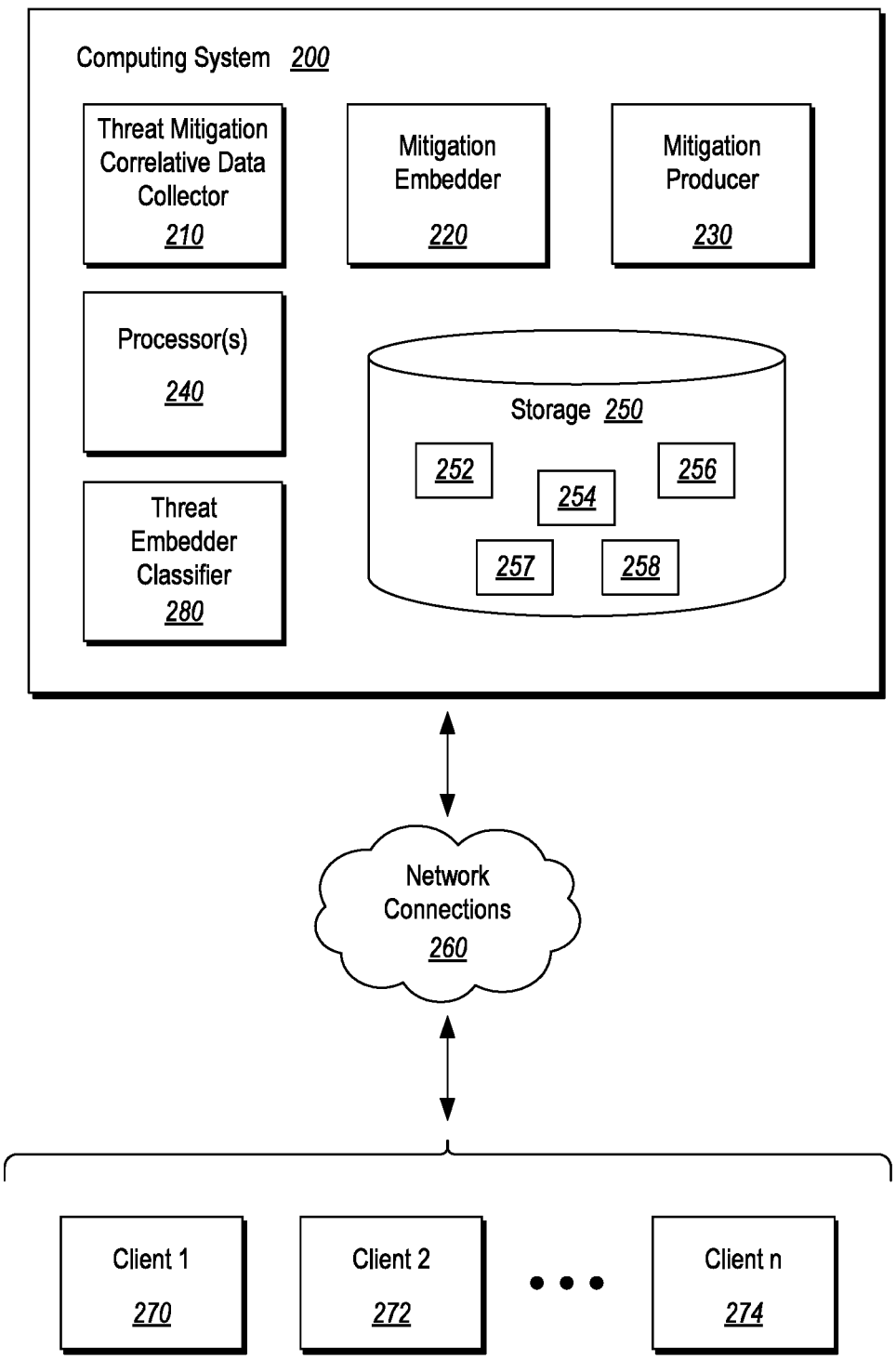
FIG. 2 illustrates an exemplary computing environment that includes a computing system that is configured to implement and/or include the disclosed embodiments.

Attention is now directed to FIG. 2, which illustrates how the aforementioned computing system 200 may contain components that are sufficiently configured to perform the acts illustrated in the flowchart 300 of FIG. 3 and the other functionality described herein. For instance, the computing system 200 includes a threat mitigation correlative data collector 210, which is specifically configured with executable code for causing the computing system 200 to collect metadata about different threat/alert types and to detect threat specific information that includes or that is used to identify different alert types. The threat mitigation correlative data collector also identifies and tags processes that are determined to be performed within a particular time/proximity to the threat/alert condition.

The computing system 200 also includes a mitigation embedder 220, which is specifically configured with code for building the correlation vector by identifying the distance attribute values of the different identified processes and for embedding/inserting this information into the correlation vector to identify the relative correlation distances of the processes to a particular threat/alert condition and to identify the processes that are sufficiently close/correlated to the alert condition to be included in the corresponding remediation process set(s).

The computing system 200 also includes a mitigation producer 230, which is specifically configured with code for generating the cluster of remediation process sets and for filtering/selecting the appropriate remediation process sets to use in generating the composite remediation file(s), as well as for generating the composite remediation file(s).

The computing system 200 also includes one or more processor(s) that are hardware processors for instantiating the various system components (e.g., 210, 220, 230) and/or for executing the executable code described above for implementing the disclosed and claimed functionality.

The computing system 200 also includes storage 250, which includes hardware storage for storing the executable code and relevant system components (e.g., 210, 220, 230), as well as for storing the various correlation vectors (252), remediation process sets (254) and composite remediation files (256) described herein. The storage 250 can be local and/or remote storage (including distributed storage). The storage can also be any combination of volatile and non-volatile storage.

The computing system 200 is connected through one or more network connections to various client systems (e.g., 270, 272, 274, and/or any quantity of other client systems) which may provide the process information to the computing system 200 to generate the correlation vectors 252, remediation process sets 254 and composite remediation files 256 and/or which may receive the composite remediation files 256 from the computing system.

The clients that communicate with the computing system through the network connections 260 may also include one more target systems that generate and send a request to the computing system for a composite remediation file that corresponds to an alert condition experienced by the target system. For instance, client n (274) may be a target system that experiences an alert condition and that generates a corresponding request for a composite remediation file for responding to the alert condition. This request for the composite remediation file may specify the particular type of alert condition and (in some instances a particular type of computing system experiencing the alert condition, such as the target system type).

In response to a request for a composite remediation file, the computing system 200 determines whether a corresponding composite remediation file exists and is accessible. Then, when it is determined the corresponding composite remediation file exists, the computing system automatically performs one or more of the acts illustrated and described in reference to the flowchart 200 of FIG. 2 to generate the composite remediation file. Alternatively, when it is determined the composite remediation file is already generated and accessible, the computing system 200 will simply identify the appropriate composite remediation file 256 from storage 250 and provide it to the target system (act 140). An administrator can then review the listed processes and determine whether to execute the processes or not and without having to search for and determine relevance of remediation processes that may or may not be related to a condition and system type that the administrator is concerned about.

The newly generated composite remediation file will also be stored so that it is accessible and ready to provide the next time it is requested. Alternatively, no composite remediation files are stored or only a subset of the generated composite remediation files are stored, based on recency of creation (e.g., within the last day, the last week, the last month, etc.), and/or which are predicted to be requested again within a certain threshold of immediacy (e.g., within the next day, the next week, the next month, etc.). One reason for not storing all composite remediation files is that they become outdated and/or they can be more accurately tuned with more information that has been received since the last creation and so as to initiate a newly tuned composite remediation file when a new request is received. In such instances, the various remediation process sets and clusters are also flushed and replaced on demand. Alternatively, the remediation process sets and clusters are maintained in storage and simply updated (when new information is available and appropriate) when a request is subsequently received for a new composite remediation file.

In some embodiments, the computing system 200 monitors the health of a target system (e.g., client n 274) and automatically detects an alert condition experienced by the target system, as well as the target system type. Then, the computing system 200, without receiving a request for a composite remediation file from the target system, automatically in response to detecting the alert condition, generates and/or provides the composite remediation file(s) associated with the alert condition (and system type) to the target system for manual application (e.g., when the composite remediation file contains non-executables) and automatic application (e.g., when the composite remediation file contains executables).

The computing system 200 may also monitor the various clients to detect alert conditions in order to trigger the generation of the various correlation vectors and/or remediation process set(s) and/or cluster(s) of remediation process set(s), even without fully generating a composite remediation file. Then, the composite remediation file is only generated in response to a specific request from a target system for the composite remediation file and/or in response to detecting the alert condition at the target system. This can help reduce the overhead and expense that would otherwise be required to constantly generate and store composite remediation files for every detected alert condition.

Real-Time Mitigations for Unknown Threat Scenarios

Figure 7:
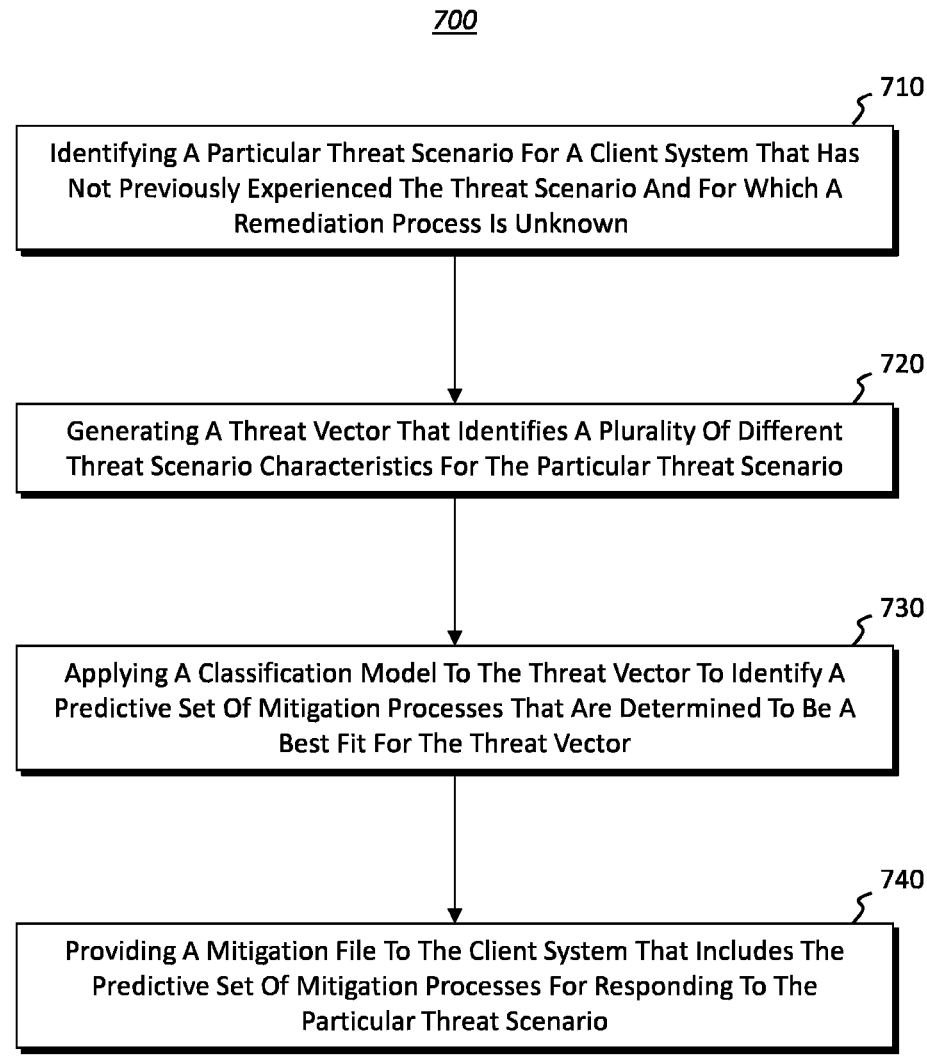
FIG. 7 illustrates a flow diagram of acts associated with disclosed methods for facilitating real-time mitigations for unknown threat scenarios.

Attention is now directed to FIG. 7, which illustrate a flowchart 700 containing acts performed by a computing system (such as computing system 200 of FIG. 2) and which are associated with the disclosed methods for facilitating real-time mitigations for unknown threat scenarios.

As shown, the computing system first identifies a particular threat scenario for a client system that has not previously experienced the threat condition (act 710). This may include, for example, computing system 200 monitoring one of the client systems and detecting an alert triggered at the client system or an irregular condition experienced the client system. This may include examining log files and/or tracking processes in real-time that are performed at the client system. The identification of the threat condition may also comprise the computing system 200 receiving a request for a composite remediation file (as discussed above) or any type of mitigation file for addressing a threat scenario. In some instances, the request is generated automatically by the client system detecting an irregularity. In other instances, the request is generated at an interface in response to a user input (e.g., an administrator submitting the request).

The identification of the threat scenario can also include any of the aforementioned techniques for identifying alerts (as described in reference to act 110). For instance, the computing system can identify the threat scenario based on detecting an anomaly associated with a configuration file a log file or a measured computer health metric associated with a computer component, such as when performing automatic health monitoring of the various client systems. In some instances, the identified threat scenario is based on detecting a file or behavior that similar to a profile associated with a virus, malware, DDoS, brute force attack, unexpected change in performance, capacity or bandwidth, an unexpected or unauthorized request, an unexpected execution or process being performed, and so forth. In some instances, the identified threat scenario may also include scenarios that do not necessarily match malicious behaviors or patterns, but which could be, such as an installation, update, modification, deletion, upload, download or other processing of a file.

Next, the computing system generates a threat vector that identifies a plurality of different threat scenario characteristics for the particular threat scenario that is detected (act 720). The threat vector is generated, for example, with the threat embedder/classifier 280, shown in FIG. 2, based on information that is provided to the computing system by the client system(s) undergoing the threat scenario (either automatically or in response to a request for the information) and/or that is obtained by the computing system from a third-party system.

In some instances, the threat vector identifies a plurality of different characteristics that are used to detect a relative correlation or similarity distance metric between a particular threat and one or more similar threat scenarios (some of which may be known and associated with known remediation protocols and some of which may be unknown or have no known remediation protocols). In this regard, the different characteristics can be thought of a distance attributes for helping the computing system to determine distances or similarities between various threats.

FIG. 8 illustrates an example of a threat vector 800, which includes one or more threats or threat types (comprising one or more processes or conditions) and various distance attributes/characteristics that are associated with the corresponding threats or threat types. In some instances, the threat vector will be composed of only a single threat. In other instances, as shown, the threat vector 800 will include multiple different treats which may be of the same type or different types. In the present representation, the various threat/alert types (e.g., A-G, n) are threat scenarios that correspond to one or more differently defined sets of processes or conditions associated with the alerts/threats that are identified during acts 110 and/or 710.

The various distance attributes are defined characteristics associated with the identified threat scenarios. Nonlimiting examples of the types of distance attributes include such things as resources/components involved, detection components, severity, threat-specific information, mitigation steps taken, time stamps, and other attributes, such as the attributes described in reference to FIG. 3. Some specific examples of distance attributes include a number of user connection attempts, a number of requests for information, a request to install or run an executable, a request to download or upload a file, a number of requests from a single user or account from multiple different locations or from new or unknown devices.

In some instances, a single threat vector is generated for all known threat scenarios. In other instances, different threat vectors are generated for different threat scenarios, each based on any combination of location, system type, system configuration or other distinguishing system characteristic.

Once the threat vector is generated, the computing system applies a classification model (e.g., the data structures described in FIGS. 3-6) to the threat vector to identify a predictive set of mitigation processes that are determined to be a best fit for the threat vector (act 730). This act (act 730) involves several processes, such as the classification of threat scenarios and identification of mitigation files, which can include the aforementioned remediation process sets and/or composite remediation files, and which can be used to mitigate the identified threat scenario(s).

For instance, the computing system applies machine learning/artificial intelligence with the threat embedder/classifier 280 to the threat vector in order to identify classes of threat scenarios and that can be used to match an unknown threat scenario (or threat scenario having no known remediation) to a threat scenario to a known threat scenario (or threat scenario having a known remediation process set or composite remediation file). Then, when an unknown threat scenario is detected that is similar to a known threat scenario having a known mitigation file (e.g., remediation process set and/or composite remediation file) then that mitigation file can be provided to the target client system (act 740).

The machine learning, which is applied by the threat embedder/classifier 280, determines relative similarities of the different threat scenarios based on the distances/similarities of the distance attributes. The similarity threshold, for determining whether threat scenarios are similar or not, can be adjusted by user input and will control the ultimate groupings/classifications of the different threats. In some embodiments, the threat embedder/classifier 280 groups the various threat scenarios into a plurality of different groups/files/data structures that include at least one group having both known and unknown threat scenarios (wherein the known threat scenario is a threat or alert having a known remediation process set and/or composite remediation file and wherein the unknown threat scenario is a threat or alert having no known remediation process set and/or composite remediation file).

Figure 9:
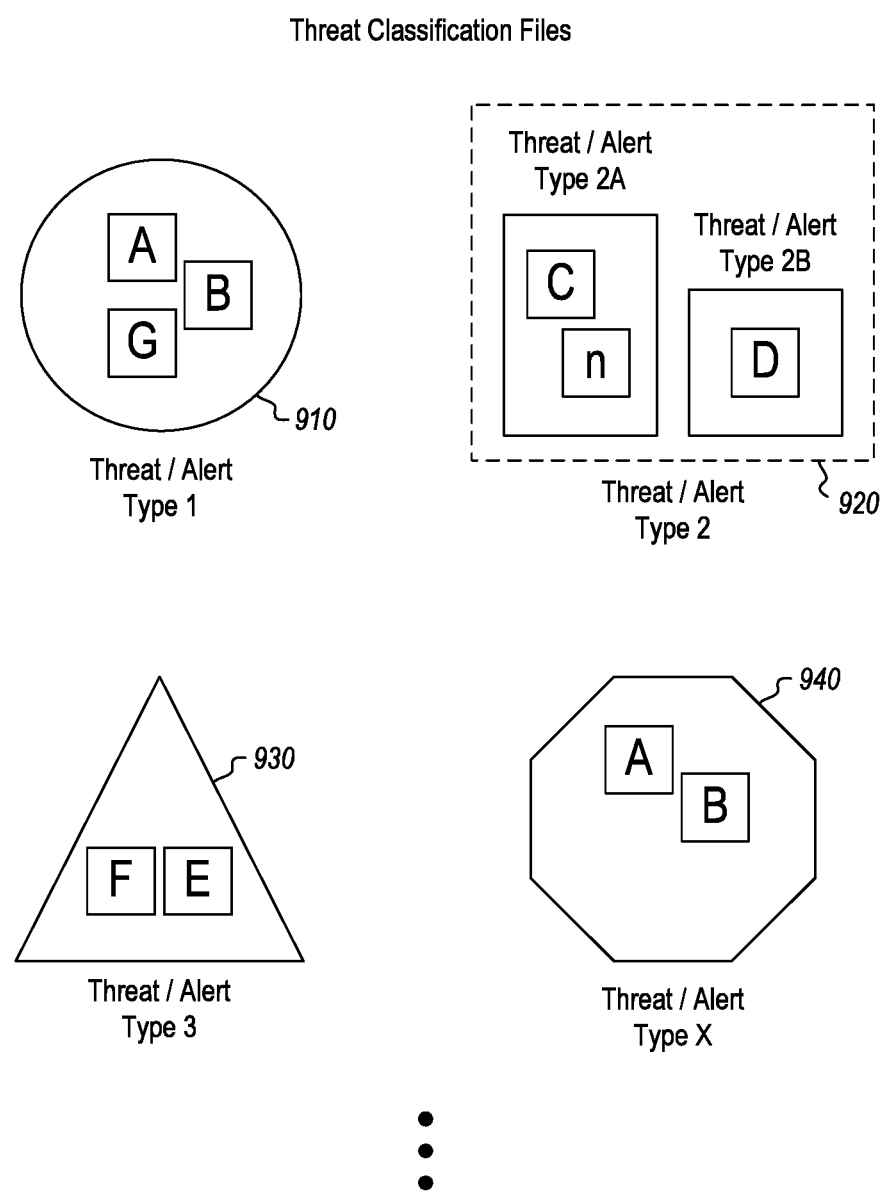
FIG. 9 illustrates a representation of different threat classification files or groupings, which include different threats/alerts that have been grouped, based on type of threat/alert.

FIG. 9 illustrates a few examples of different types of threat scenario groupings, wherein groupings 910, 920 and 930 all have mutually exclusive sets of threats/alerts associated with the different groupings. In other instances, as shown by grouping 940 and 910, it is possible for two different groupings to share at least one common threat/alert (e.g., B).

In yet other embodiments, a single classified grouping 920 may contain multiple subgroupings of different similar/yet distinguishable alert types.

Once the different groupings/classifications of the threat scenarios occur, these groupings can be saved, such as threat classification files (257) stored in storage 250 of the computing system 200, shown in FIG. 2.

The threat embedder/classifier 280 can also store mitigation files 258 in the storage 250, which are provided to the different client systems.

As noted above, the mitigation files 258 are listings of mitigation processes for mitigating/responding to the particular threat scenario associated with the mitigation file(s) 258.

The computing system 200 identifies/builds the mitigation files (258) from the remediation process sets and/or composite remediation files described in FIGS. 4 and 5. In some instances, the mitigation files comprise a remediation process set that is associated with a known alert and that also matches the unknown threat according to the classified groupings described in FIG. 9.

In other instances, the mitigation files comprise a composite remediation file that is associated with a known alert and that also matches the unknown threat according to the classified groupings described in FIG. 9.

In some embodiments, the mitigation file comprises a non-executable list of remedial actions for addressing the threat scenario. In alternative or additional embodiments, the mitigation file comprises an executable file having executable instructions corresponding to the remediation process sets for automatically performing remedial actions in response to running the mitigation file at the client system.

It will be appreciated that the scope of this disclosure includes any combination of the foregoing embodiments. It will be appreciated, in view of the foregoing, that the current embodiments enable a computing system to more efficiently, than existing techniques, generate and provide composite remediation files that are relevant for target systems experiencing threat conditions, including unknown threat conditions, and which may be used to remediate those threat conditions.

By way of example, and utilizing the current embodiments, it is possible for a system to distinguish a brute-force attack (threat scenario A) form a DDoS attack (threat scenario B) and from another type of threat scenario C (e.g., running of malicious executable code on an application at a client system). In this embodiment, the computing system will determine that the threat scenario A (which may be unknown and have no known mitigation file) is more similar to threat scenario B (which may be known and have a known composite remediation file) than to threat scenario C (which may also be known and have a known composite remediation file). In this situation, the computing system will determine the similarity and provide the client system being affected by threat scenario A with a mitigation file comprising the composite remediation file associated with threat scenario B.

The disclosed methods may be practiced by various types of special purpose or general-purpose computing systems including computer hardware. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising one or more processors and one or more hardware storage devices having stored computer-executable instructions which are executable by the one or more processors for causing the computing system to perform real-time mitigations for unfamiliar threat scenarios, and by at least causing the computing system to perform the following:
   identify a particular threat scenario for a client system that has not previously experienced the threat scenario and for which a remediation process is unknown;
   generate a threat vector that identifies a plurality of different threat scenario characteristics for the particular threat scenario;
   apply a classification model to the threat vector to identify a predictive set of mitigation processes that are determined to be a best fit for the threat vector, wherein the classification model includes a plurality of different client remediation process sets that correspond to different types of alerts associated with different threat scenarios, at least some of the different threat scenarios correlating with the particular threat scenario; and
   provide a mitigation file to the client system that includes the predictive set of mitigation processes for responding to the particular threat scenario.

2. The computing system of claim 1, wherein the different types of alerts associated with the different threat scenarios correspond to different client systems.

3. The computing system of claim 1, wherein the method further includes generating the plurality of different client remediation process sets for each type of alert of the different types of alerts by performing, for each identified alert, the following:
   identifying a plurality of processes performed by a corresponding plurality of different client systems that are performed within a predetermined time and/or process proximity to the identified alert;
   determining which of the plurality of processes are related to the identified alert based on a correlation vector of the plurality of processes and the identified alert; and
   for each client of the plurality of different client systems, creating a client remediation process set that includes the processes that are determined to be related to the identified alert and that were performed by the client within the predetermined period of time and/or process proximity to the identified alert.

4. The computing system of claim 3, wherein the mitigation file comprises remediation processes that are included in the plurality of different client remediation process sets that are identified as corresponding to alert types determined to correlate with the particular threat scenario.

5. The computing system of claim 1, wherein the mitigation file comprises an executable file with executable instructions for automatically performing remedial actions in response to running the mitigation file at the client system.

6. The computing system of claim 1, wherein the mitigation file comprises a non-executable file comprising a list of recommended remedial actions for addressing the threat scenario.

7. A method for performing real-time mitigations for unfamiliar threat scenarios, the method comprising:
   identifying a particular threat scenario for a client system that has not previously experienced the threat scenario and for which a remediation process is unknown;
   generating a threat vector that identifies a plurality of different threat scenario characteristics for the particular threat scenario;
   applying a classification model to the threat vector to identify a predictive set of mitigation processes that are determined to be a best fit for the threat vector, wherein the classification model includes a plurality of different client remediation process sets that correspond to different types of alerts associated with different threat scenarios, at least some of the different threat scenarios correlating with the particular threat scenario; and
   providing a mitigation file to the client system that includes the predictive set of mitigation processes for responding to the particular threat scenario.

8. The method of claim 7, wherein the different types of alerts associated with the different threat scenarios correspond to different client systems.

9. The method of claim 8, wherein the method further includes generating the plurality of different client remediation process sets for each type of alert of the different types of alerts by performing, for each identified alert, the following:
   identifying a plurality of processes performed by a corresponding plurality of different client systems that are performed within a predetermined time and/or process proximity to the identified alert;
   determining which of the plurality of processes are related to the identified alert based on a correlation vector of the plurality of processes and the identified alert; and
   for each client of the plurality of different client systems, creating a client remediation process set that includes the processes that are determined to be related to the identified alert and that were performed by the client within the predetermined period of time and/or process proximity to the identified alert.

10. The method of claim 9, wherein the mitigation file comprises remediation processes that are included in the plurality of different client remediation process sets that are identified as corresponding to alert types determined to correlate with the particular threat scenario.

11. The method of claim 7, wherein the mitigation file comprises an executable file with executable instructions for automatically performing remedial actions in response to running the mitigation file at the client system.

12. The method of claim 7, wherein the mitigation file comprises a non-executable file comprising a list of recommended remedial actions for addressing the threat scenario.

13. A hardware storage device having stored computer-executable instructions which are executable by one or more processors of a computing system for causing the computing system to perform real-time mitigations for unfamiliar threat scenarios and by at least causing the computing system to perform the following:
   identify a particular threat scenario for a client system that has not previously experienced the threat scenario and for which a remediation process is unknown;
   generate a threat vector that identifies a plurality of different threat scenario characteristics for the particular threat scenario;
   apply a classification model to the threat vector to identify a predictive set of mitigation processes that are determined to be a best fit for the threat vector, wherein the classification model includes a plurality of different client remediation process sets that correspond to different types of alerts associated with different threat scenarios, at least some of the different threat scenarios correlating with the particular threat scenario; and
   provide a mitigation file to the client system that includes the predictive set of mitigation processes for responding to the particular threat scenario.

14. The hardware storage device of claim 13, wherein the different types of alerts associated with the different threat scenarios correspond to different client systems.

15. The hardware storage device of claim 14, wherein the stored computer-executable instructions are further executable for causing the computing system to generate the plurality of different client remediation process sets for each type of alert of the different types of alerts by performing, for each identified alert, the following:
   identifying a plurality of processes performed by a corresponding plurality of different client systems that are performed within a predetermined time and/or process proximity to the identified alert;
   determining which of the plurality of processes are related to the identified alert based on a correlation vector of the plurality of processes and the identified alert; and
   for each client of the plurality of different client systems, creating a client remediation process set that includes the processes that are determined to be related to the identified alert and that were performed by the client within the predetermined period of time and/or process proximity to the identified alert.

16. The hardware storage device of claim 15, wherein the mitigation file comprises remediation processes that are included in the plurality of different client remediation process sets that are identified as corresponding to alert types determined to correlate with the particular threat scenario.

17. The hardware storage device of claim 1, wherein the mitigation file comprises an executable file with executable instructions for automatically performing remedial actions in response to running the mitigation file at the client system.

18. The hardware storage device of claim 13, wherein the mitigation file comprises a non-executable file comprising a list of recommended remedial actions for addressing the threat scenario.

* * * * *